June 10, 1952  H. E. SLOAN  2,599,664
SWIVEL CONNECTION FOR AIR-OPERATED CHUCKS
Filed March 1, 1950
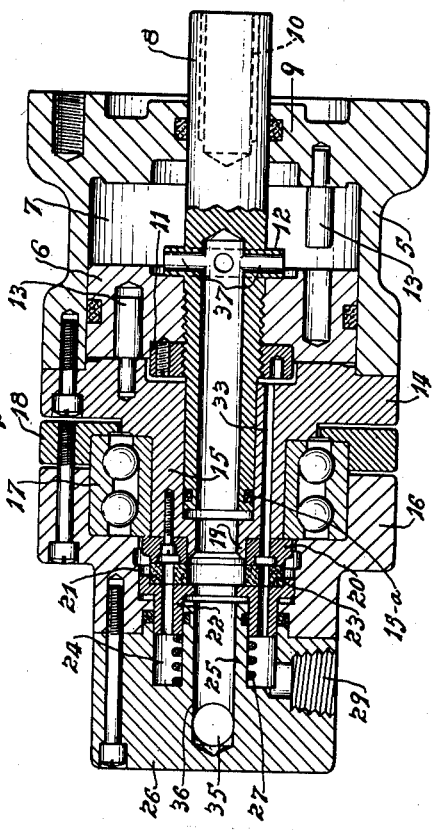
INVENTOR.
HARRY E. SLOAN
BY
*Louis V. Lucia*
ATTORNEY.

Patented June 10, 1952

2,599,664

UNITED STATES PATENT OFFICE 2,599,664

SWIVEL CONNECTION FOR AIR-OPERATED CHUCKS

Harry E. Sloan, Hartford, Conn., assignor to The Cushman Chuck Company, Hartford, Conn., a corporation of Connecticut Application March 1, 1950, Serial No. 146,943

4 Claims. (Cl. 121—38)

This invention relates to a swivel connection for air-operated chucks and more particularly to such a connection as fully described in Patent No. 2,568,092 issued September 18, 1951, to Harry E. Sloan and George A. Highberg.

It is an object of the present invention to provide a swivel connection which will insure an airtight seal between a stationary air supply member and a rotatable air-operated member.

A further object of this invention is to provide an improved swivel connection having particular desirable features of construction which differ from the structure of the co-pending application and which are particularly adapted to provide a seal of simpler and more efficient construction.

A still further object of the invention is to provide a mechanism wherein the swivel connection is located at one side of an air-operated piston and air pressure is supplied to the opposite side of said piston through a passage coaxial with the piston.

Further objects and advantages of this invention will be more clearly understood from the following description and from the accompanying drawings in which:

Fig. 1 is a sectional view, on line 1—1 of Fig. 2, illustrating an embodiment of my invention.

Fig. 2 is an end view thereof.

Fig. 3 is an end view of the seal carrying sleeve used in said connection.

Fig. 4 is an end view of the sealing member.

Fig. 5 is an end view of the seal engaging ring.

Fig. 6 is an end view of the spindle member used in said connection.

As shown in the drawings, the numeral 5 denotes a cylinder which may be mounted on a machine in which an air chuck is to be operated in a conventional manner. This cylinder contains a piston 6 which is slidable within an air chamber 7 and is carried on a coaxial operating shaft 8 that slides through the end wall 9 of said cylinder and is connected, in a conventional manner, to the chuck in the machine on which the said swivel connection is used. This shaft 8 may be secured to a separate operating member that may be threaded to the internal thread 10 indicated in dotted lines on the said shaft, but the chuck and the connection between it and the shaft 8 are not shown for the reason that my invention is not necessarily limited for use with chucks exclusively.

The piston 6 is secured to the shaft 8 between a nut 11 and an annular flange 12 and rotation of the said piston within the chamber 7 may be prevented by studs 13—13 which project from the opposite ends of the chamber into recesses in said piston.

The said cylinder 5 is provided with a head 14 which has a projecting spindle portion 15 thereon within which the end of the shaft 8 is slidably positioned. A seal is maintained between the spindle and the shaft by means of a packing ring 15-a. A seal housing 16 is rotatably mounted on the spindle 15 by means of anti-friction bearings 17 which are secured to said housing by a clamping ring 18.

The said spindle portion 15 has a projecting end portion 19 upon which is positioned a sealing ring 20 that is secured to the end of the spindle portion 15 by means of screws as shown.

The housing 16 has therein a chamber 21 in which there is slidably contained a sleeve 22 which carries the sealing member 23 that is in the shape of a ring and is preferably constructed of a suitable sealing material, such as graphite or the like; the said sealing member being carried upon the end of the sleeve 22 and positioned between the said end of the sleeve and the surface of the seal engaging ring 20.

The sleeve 22 extends into an annular chamber 24 which surrounds a tubular projection 25 in a head 26 that is secured to the seal housing 16. A spring 27 is positioned within the said chamber 24 to urge the sleeve 22 into contact with the sealing member 23.

A pressure medium is supplied through said connection for the operation of the piston 6 and the conductor for said pressure medium includes a supply pipe 28 which is threaded to the opening 29 in the head 26 and communicates with the chamber 24. The said chamber communicates with one side of the piston 6 through a series of passages 30 in the sleeve 22, passages 31 in the sealing member, the annular groove 32 in the sealing ring, the passages 32-a in said sealing ring, and the passages 33 in the spindle 15 which extend into the chamber 7 at one side of the piston 6.

The said chamber 7, at the opposite side of the piston 6, is connected to the pressure supply by means of a pipe 34 which communicates with said cylinder through the opening 35, coaxial passages 36 in the head 26, the sleeve 22, the sealing member 23, the sealing ring 20, the spindle 15 and the shaft 8, and through radial passages 37 in the flange 12.

From the above description, it will be understood that, when it is desired to operate a device such as a chuck, or other mechanism with which my improved swivel connection is used, a pressure medium, such as air, may be supplied through the pipe 28, the chamber 24, and the passages 30, 31, 32-a, and 33 into one end of the cylinder 7. This will force the piston 6 to the opposite end of the cylinder 7 and move therewith the shaft 8 which is connected by suitable means to the said device. When it is desired to operate the device in the opposite direction, air is supplied through the pipe 34, the coaxial passages above mentioned, and through the radial passages 37 into the said cylinder.

The passages 30, 31, 32-a, and 33 are provided in groups and the area of the entire group is equal to the area of the opening 29 through which the pressure medium is delivered into the passages. Also, the radial passages 37 are provided in a group, the total area of which at least equals the area of the opening 35 and the coaxial passages. This permits the full supply of pressure medium which passes through the openings 29 and 35 to be delivered into the cylinder chamber 7.

It will be noted that, by means of my above described invention, I have provided a swivel connection for pressure which includes a passage extending through the piston in a cylinder for delivering the pressure into said cylinder without requiring passages extending through the wall of the cylinder, as heretofore commonly used and as shown in the above mentioned copending application, in order to bypass the piston. This feature of the invention is of considerable importance since it eliminates the necessity of providing a group of passages in the cylinder walls and the necessary connections between the passages of the cooperating members and thereby materially simplifies the manufacture of swivel connection and provides a more desirable and highly preferred construction.

I claim:

1. In combination with a cylinder having a chamber therein and a piston slidably mounted in said chamber, a spindle secured to said cylinder, an operating shaft extending through said piston and slidable in said spindle and extending through the bottom wall of the cylinder, a housing journalled on the spindle, a coaxial chamber in said housing, an annular chamber surrounding the said coaxial chamber, an annular sleeve slidable in the annular chamber and separating it from the coaxial chamber, sealing means between said sleeve and housing, a seal between said sleeve and the end of the spindle, a coaxial passage in said shaft communicating with the said coaxial chamber through said seal and extending through the piston, and passages communicating said coaxial passage in the shaft with the cylinder chamber.

2. In combination with a cylinder having a chamber therein and a piston slidably mounted in said chamber, a spindle on said cylinder, an operating shaft extending through said piston, the shaft being slidable in said spindle and extending through the bottom wall of the cylinder, a housing journaled on the spindle, a coaxial chamber in said housing, an annular chamber surrounding said coaxial chamber, a tubular projection in said housing extending between said annular and coaxial chambers, an annular sleeve slidable in the annular chamber over the said tubular projection, a seal between said sleeve and the end of the spindle, spring means surrounding said tubular projection and urging said sleeve for pressing the seal against the end of the spindle, a coaxial passage in said shaft communicating with the coaxial chamber in the housing through said seal and extending through the piston, passages communicating said coaxial passage in the shaft with the cylinder chamber, and separate passages communicating said annular passage with the cylinder chamber.

3. The combination as set forth in claim 2 wherein the said separate passages extend longitudinally through the seal and sleeve.

4. The combination as set forth in claim 2 wherein an end portion of the sleeve is slidable in the annular chamber and sealed to the opposite walls thereof, and the separate passages extend longitudinally through said sleeve, seal and spindle between the annular chamber and the cylinder chamber.

HARRY E. SLOAN.

REFERENCES CITED

The following references are of record in the file of this patent:

UNITED STATES PATENTS

| Number | Name | Date |
| --- | --- | --- |
| 1,656,149 | Hopkins | Jan. 10, 1928 |
| 1,934,411 | Dahlman | Nov. 7, 1933 |
| 2,415,181 | Johnson | Feb. 4, 1947 |
| 2,420,626 | Stevenson | May 13, 1947 |
| 2,568,092 | Sloan et al. | Sept. 18, 1951 |